US010990146B2

(12) United States Patent
Muthukaruppan et al.

(10) Patent No.: US 10,990,146 B2
(45) Date of Patent: *Apr. 27, 2021

(54) DIGITAL SYNTHESIZABLE LOW DROPOUT REGULATOR WITH ADAPTIVE GAIN

(71) Applicant: Intel Corporation, Santa Clara, CA (US)

(72) Inventors: Ramnarayanan Muthukaruppan, Bangalore (IN); Pradipta Patra, Bangalore (IN); Gaurav Goel, Bangalore (IN); Uday Bhaskar Kadali, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 84 days.

This patent is subject to a terminal disclaimer.

(21) Appl. No.: 16/359,810

(22) Filed: Mar. 20, 2019

(65) Prior Publication Data

US 2019/0220074 A1 Jul. 18, 2019

Related U.S. Application Data

(63) Continuation of application No. 15/025,871, filed as application No. PCT/US2013/076298 on Dec. 18, 2013, now Pat. No. 10,268,249.

(51) Int. Cl.
*G06F 1/00* (2006.01)
*G06F 1/26* (2006.01)
*G05F 1/59* (2006.01)

(52) U.S. Cl.
CPC .................. *G06F 1/26* (2013.01); *G05F 1/59* (2013.01)

(58) Field of Classification Search
CPC ...................................... G06F 1/26; G05F 1/59
See application file for complete search history.

(56) References Cited

U.S. PATENT DOCUMENTS

| 5,548,192 | A | 8/1996 | Hanks |
| 5,740,420 | A | 4/1998 | Palaniswami |
| (Continued) | | | |

FOREIGN PATENT DOCUMENTS

| JP | H096405 A | 1/1997 |
| JP | 200525924 A | 1/2005 |
| JP | 2010098050 A | 4/2010 |
| WO | 2012101822 A1 | 8/2012 |

OTHER PUBLICATIONS

International Search Report dated Oct. 30, 2014 for PCT/US2013/076298, filed Dec. 18, 2013, 2 pages.

(Continued)

*Primary Examiner* — Xuxing Chen
(74) *Attorney, Agent, or Firm* — Schwabe, Williamson & Wyatt, P.C.

(57) ABSTRACT

Described is a voltage regulator with adaptive gain, which comprises: a plurality of power-gate transistors controllable by a digital bus, the plurality of power-gate transistors operable to provide a first power supply to a load, and to receive a second power supply as input; an analog-to-digital converter (ADC) to receive the first power supply and to generate a digital output representative of the first power supply; and a controller to receive the digital output representative of the first power supply and to generate the digital bus for controlling the plurality of power-gate transistors such that a transfer function of the plurality of power-gate transistors is substantially linear over an operating range.

23 Claims, 6 Drawing Sheets

(56) References Cited

U.S. PATENT DOCUMENTS

| | | |
|---|---|---|
| 8,816,661 B2 | 8/2014 | Candage et al. |
| 2004/0046535 A1 | 3/2004 | Duffy et al. |
| 2005/0151571 A1* | 7/2005 | Brown .................. H02M 3/157 327/172 |
| 2005/0179421 A1 | 8/2005 | Wang et al. |
| 2006/0132110 A1 | 6/2006 | Tang |
| 2009/0174262 A1 | 6/2009 | Martin et al. |
| 2009/0189577 A1 | 7/2009 | Lin et al. |
| 2010/0176794 A1 | 7/2010 | Tsen et al. |
| 2012/0159219 A1 | 6/2012 | Huang et al. |
| 2012/0229104 A1 | 9/2012 | Pierson et al. |
| 2013/0305065 A1 | 11/2013 | Tanaka et al. |
| 2014/0077984 A1 | 3/2014 | Shu |
| 2014/0266143 A1* | 9/2014 | Saint-Laurent ......... G05F 1/462 323/351 |
| 2014/0359311 A1* | 12/2014 | Jahagirdar ............ G06F 1/3296 713/300 |

OTHER PUBLICATIONS

Written Opinion of the International Searching Authority dated Oct. 30, 2014 for PCT/US2013/076298, filed Dec. 18, 2013, 4 pages.
European Search Report and Search Opinion Received for EP Application No. 13899398.5, dated Aug. 16, 2017, 10 pages.
Notification Concerning Transmittal of International Preliminary Report on Patentability issued for Patent Application No. PCT/US2013/076298, dated Jun. 30, 2016.
Non-Final Office Action dated May 11, 2017 for U.S. Appl. No. 15/025,871, 19 pages.
Final Office Action dated Dec. 18, 2017 for U.S. Appl. No. 15/025,871, 15 pages.
Non-Final Office Action dated Jun. 23, 2018 for U.S. Appl. No. 15/025,871, 11 pages.
Notice of Allowance dated Dec. 5, 2018 for U.S. Appl. No. 15/025,871, 16 pages.

* cited by examiner

DIGITAL SYNTHESIZABLE LOW DROPOUT REGULATOR WITH ADAPTIVE GAIN

CROSS REFERENCE TO RELATED APPLICATIONS

The present application is a continuation of U.S. application Ser. No. 15/025,871, filed Mar. 29, 2016, entitled "DIGITAL SYNTHESIZABLE LOW DROPOUT REGULATOR WITH ADAPTIVE GAIN" which is a national phase entry under 35 U.S.C. § 371 of International Application No PCT/US2013/076298, filed Dec. 18, 2013, entitled "DIGITAL SYNTHESIZABLE LOW DROPOUT REGULATOR WITH ADAPTIVE GAIN", which designated, among the various States, the United States of America. The contents of U.S. application Ser. No. 15/025,871 and International Application No. PCT/US2013/076298 are hereby incorporated by reference in their entireties.

BACKGROUND

Existing low dropout (LDO) regulator architecture uses analog voltage to control the gate drive to the LDO regulator. Generating the analog voltage may require careful design of the circuit generating the analog circuit. Generally such circuits do not scale well with process technologies. To regulate the output voltage of the LDO, head room (e.g., of about 50 mV to 120 mV) may be required between the input power supply voltage and the output voltage of the LDO regulator. With respect to the analog LDO regulator approach, there are many challenges.

For example, stability of the feedback loop of the analog LDO regulator may be extremely dependent on package parasitic and the output pole. As a result, to gain stability of the feedback loop a penalty in bandwidth may be made. The analog LDO regulator may also exhibit a minimum dropout at its output node (e.g., 50 mV to 120 mV) for LDO regulator normal operation. When input power supplies are getting lower, such minimum dropout becomes a challenge. The analog LDO regulator may also exhibit a finite direct-current (DC) offset error due to gain limitations that affect the DC set point accuracy. There are also multiple integration and design challenges in analog designs, especially those that use dual loop architecture.

A power FET (Field Effect Transistor) array may be used for an LDO regulator to provide power to the output node such that the array is connected as a parallel bank. The transfer function of this FET array is non-linear. FIG. 1A illustrates a plot 100 showing the non-linear transfer function of a parallel bank of FET array. Here, x-axis is a code. Higher the code, the more transistors in the parallel bank are turned ON. The y-axis is resistance of the parallel bank of transistors. As more transistors are turned ON (i.e., code number increases), resistance of the parallel bank falls non-linearly. Since the transfer function has a non-linear gain, for operating points of the LDO voltage regulator (VR) where the value of code 'N' is high, the gain of the system is low, and when the code 'N' is low, the gain of the system is high. This makes the transient response sharp when 'N' is low and sluggish when 'N' is high. Such non-linear response of the LDO VR is a challenge when output of the LDO VR experiences a voltage droop, for example, due to sudden change in load demand.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1A:
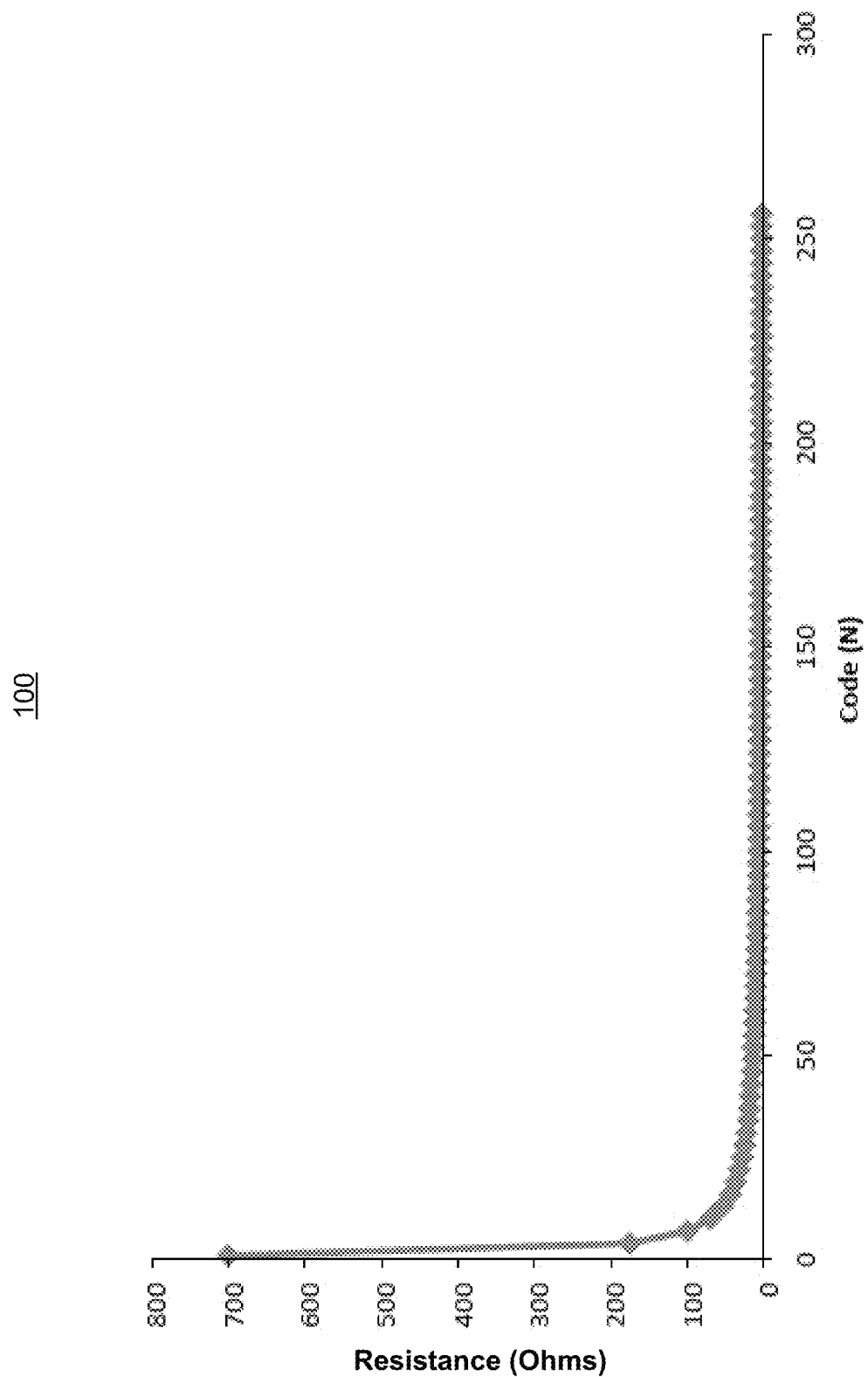
FIG. 1A illustrates a plot showing non-linear transfer function of parallel bank of FETs.

The embodiments describe an apparatus, e.g., digital low dropout (DLDO) VR (voltage regulator), which comprises: a plurality of power-gate transistors controllable by a digital bus, the plurality of power-gate transistors operable to provide a first power supply to a processing core, and to receive a second power supply as input; an analog to digital converter (ADC) to receive the first power supply and to generate a digital output representative of the first power supply; and a controller to receive the digital output representative of the first power supply and to generate the digital bus for controlling the plurality of power-gate transistors.

There are several technical effects of the DLDO VR. Some non-limiting technical effects include uniform gain across the operating regions of the DLDO VR to make the response fast for all operating points. In one embodiment, uniform gain across the operating regions is achieved by adding an extra gain factor which is a function of the operating point to the filter transfer function.

Other exemplary technical effects include near elimination of DC (direct current) current path in a controller of the DLDO VR since it is a synthesized logic with low quiescent current in standby mode. In one embodiment, the coefficients of the DLDO VR controller are reprogrammable which allow the loop in the DLDO VR to be tuned late even after the SoC (System-on-Chip) is fabricated. In one embodiment, the controller of the DLDO VR compensates for the pole on the output node of the DLDO VR, and so there is nearly zero DC gain error in the DLDO VR loop. The DLDO VR of the embodiments allow for soft start of the power-gates using digital control. The architecture of the DLDO VR allows for designers to have control over the distribution of power-gates with similar weights to ensure uniform power delivery to all sections of the load (driven by the DLDO VR).

The embodiment of the DLDO VR allows for employing non-linear control features like asymmetric/non-linear gain functions to improve the droop response of the DLDO VR. The embodiment of the DLDO VR allows for input voltage to be defined by a digital VID (voltage identification) code, which is simpler to implement (compared to analog circuits) in the digital domain. The embodiment of the DLDO VR allows for integrating simpler Design-for-Test (DFT) circuits as more circuits of the DLDO VR are digital (compared to a regular LDO). Such DFTs can allow for High Volume Manufacturing (HVM) testing.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a", "an", and "the" include plural references. The meaning of "in" includes "in" and "on."

The term "scaling" generally refers to converting a design (schematic and layout) from one process technology to another process technology. The term "scaling" generally also refers to downsizing layout and devices within the same technology node. The terms "substantially," "close," "approximately," "near," "about," generally refer to being within +/−20% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors are metal oxide semiconductor (MOS) transistors, which include drain, source, gate, and bulk terminals. The transistors also include Tri-Gate and FinFET transistors. Source and drain terminals may be identical terminals and are interchangeably used herein. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates a n-type transistor (e.g., NMOS, NPN BJT, etc.) and the term "MP" indicates a p-type transistor (e.g., PMOS, PNP BJT, etc.).

The term "power state" or "power mode" generally refers to performance level of the processor or SoC (System-on-Chip). Power states may be defined by Advanced Configuration and Power Interface (ACPI) specification, Revision 5.0, Published Nov. 23, 2011. However, the embodiments are not limited to ACPI power states. Other standards and non-standards defining power state may also be used.

Figure 1B:
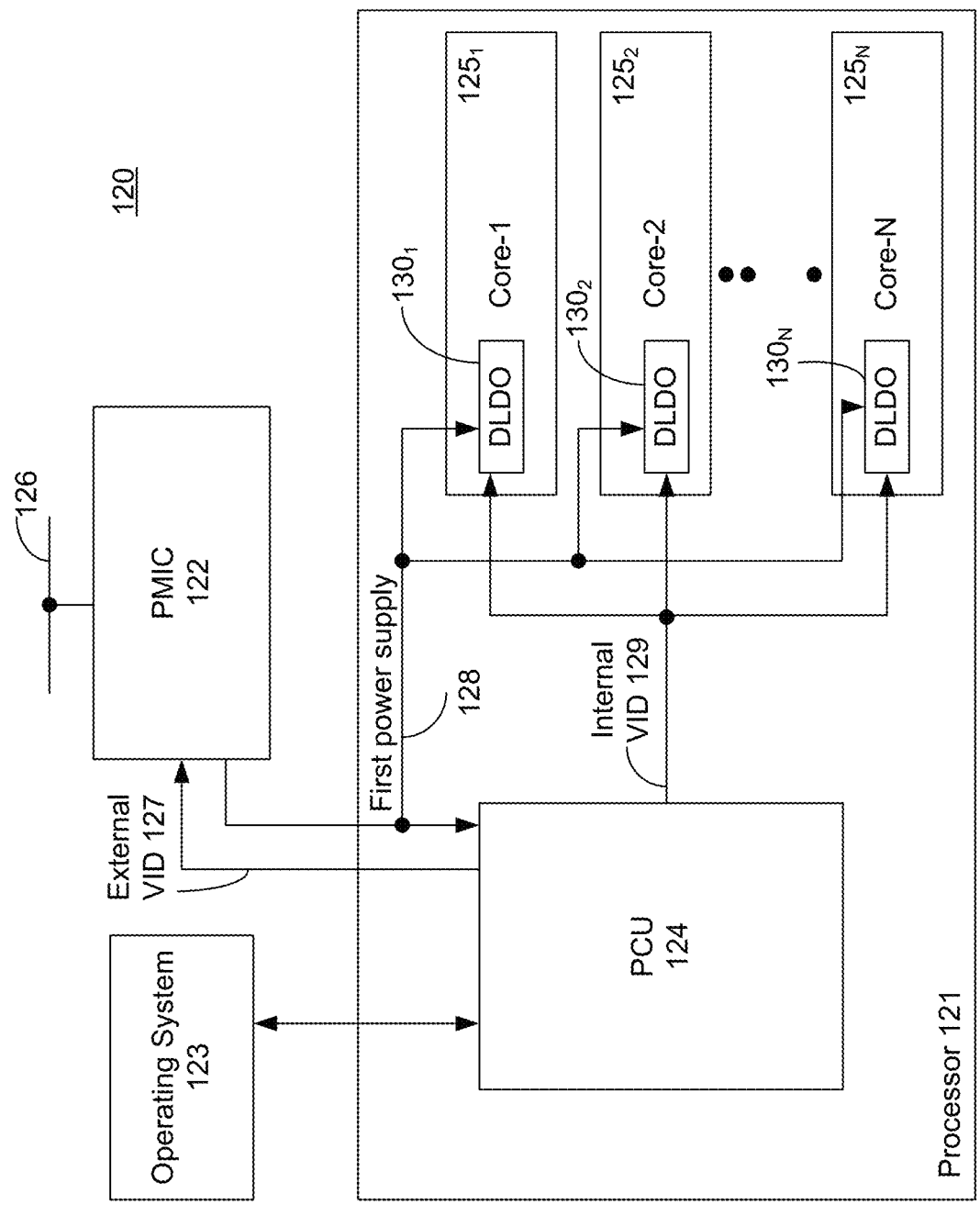
FIG. 1B illustrates a power architecture with one or more digital low dropout (DLDO) voltage regulators (VRs), according to one embodiment of the disclosure.

FIG. 1B illustrates a power architecture 120 with one or more DLDO VRs, according to one embodiment of the disclosure. In one embodiment, power architecture 120 comprises a processor 121, a power module integrated circuit (PMIC) 122, and an operating system 123.

In one embodiment, processor 121 comprises one or more processing cores $125_{1-N}$, where 'N' is an integer greater than one. In one embodiment, a control unit 124 (e.g., a power control unit (PCU)) is operable (e.g., via operating system 123) to generate at least two VID (voltage identification) codes to provide power supply to various components of the processor 121.

In one embodiment, PCU 124 sends out VID 127 (also called external VID or first VID) to PMIC 122. In one embodiment, PMIC 122 is an off-die VR i.e., not integrated on the same die as processor 121. In one embodiment, PMIC 122 is positioned in the same package as package for processor 121. In one embodiment, PMIC 122 is fully integrated in processor 121 (i.e., PMIC 122 is on the same die as processor 121).

In one embodiment, VID 127 is 7 bits of VID code. In other embodiments, fewer or more bits of code may be used to represent VID. In one embodiment, VID 127 is a request code for requesting PMIC 122 to provide power supply corresponding to VID 127. In one embodiment, PMIC 122 receives an external power supply 126 (e.g., from a power outlet, computer battery, etc.) and generates a regulated first power supply 128 corresponding to the VID 127. For example, VID 127 indicates to PMIC 122 that a 1.15V is needed to power processor 121. PMIC 122 then generates a regulated 1.15V power supply as first power supply 128. In one embodiment, some or all processing cores $125_{1-N}$ receive first power supply 128.

In one embodiment, PCU 124 sends out a second VID 129 (also called internal VID) to some or all processor cores $125_{1-N}$. In one embodiment, each processor core receives an independent VID (shown for simplicity sake as a single bus 129). In such an embodiment, each independent VID 129 provides the power supply setting for the individual processor core. In one embodiment, each processing core includes a DLDO VR, for example, $130_{1-N}$, where 'N' is an integer. DLDO VR is described with reference to FIG. 2.

Referring back to FIG. 1B, in one embodiment each DLDO VR receives first power supply 128 as an input power supply, and also receives its VID 129 which is used to instruct the DLDO VR to generate a particular level of output power supply for that core. For example, DLDO VR $130_1$ receives VID 129 and generates a 0.9V regulated power supply for core-1 $125_1$ using 1.15V first power supply 128. In another example, DLDO VR $130_2$ receives its corresponding VID 129 and generates a 0.9V regulated power supply for core-2 $125_2$ using 1.15V first power supply 128 as input. Using the above example, in one embodiment, DLDO VR $130_1$ can seamlessly (i.e., seamless to its load) provide a regulated power supply of 0.9V from previous 1.15V even when the first power supply 128 is lowered to 1.0V by the external VID 127.

In one embodiment, individual processor cores $125_{1-N}$ are coupled to the first power supply 128 via integrated VRs (e.g., DLDO VRs $130_{1-N}$) and the output voltage of these integrated VRs are defined by internal VID 129. In one embodiment, internal VID 129 is also 7 bits of code like external VID 127. In other embodiments, internal VID 129 and external VID 127 have different number of bits.

In one embodiment, external VID 127 setting is defined by the voltage required by the processor core (among processor cores $125_{1-N}$) wanting to operate with highest performance (e.g., high power and high frequency—turbo mode). In one embodiment, DLDO VR of that processor core operates in bypass mode and receives internal VID 129 to cause a controller of DLDO VR to turn ON all power-gates of the DLDO VR. In such an embodiment, for all other processing cores that have a lower performance requirements, internal VID 129 for those processing cores is set such that corresponding DLDO VRs (or integrated VRs) have a lower output voltage to match the requirement for the required performance.

In one embodiment, since the processing core operating at the highest performance will have its integrated VR (i.e., DLDO VR) operating in bypass mode (i.e., all or most power-gates are turned ON), there is no (or nearly zero) power loss due to cascading effect of two or more VRs. In such an embodiment, for all other processing cores operating at a lower performance mode, power is saved because the input supply voltage for the corresponding VRs (i.e., DLDO VRs of those processers operating in lower performance mode) is scaled down. In one embodiment, when all processing cores $125_{1-N}$ are operating in the same performance mode then all the integrated VRs are in bypass mode and the voltage for the processing cores $125_{1-N}$ are set by the external VID 127. In one embodiment, different processing cores can seamlessly transition into different power states and the internal and external VIDs (129 and 127) can be changed as required for various scenarios.

In one embodiment, each DLDO VR includes a controller to provide uniform gain across the operating regions of the DLDO VR to make the response fast for all operating points. In one embodiment, uniform gain across the operating regions is achieved by adding an extra gain factor which is a function of the operating point to the filter transfer function.

Figure 2:
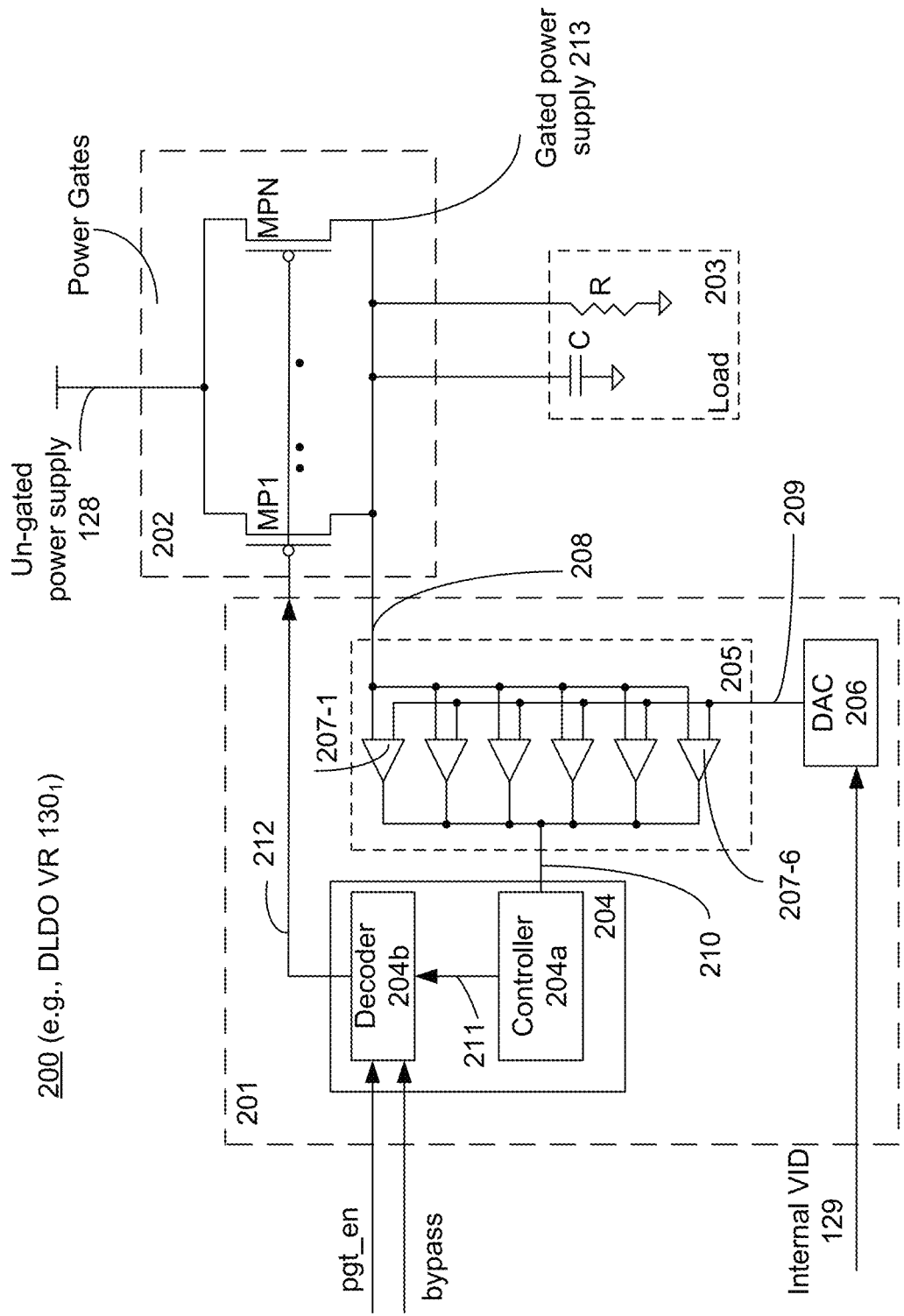
FIG. 2 illustrates a DLDO VR, according to one embodiment of the disclosure.

FIG. 2 illustrates a DLDO VR 200 (e.g., DLDO VR $130_1$), according to one embodiment of the disclosure. It is pointed out that those elements of FIG. 2 having the same reference numbers (or names) as the elements of any other figure can operate or function in any manner similar to that described, but are not limited to such.

In one embodiment, DLDO VR 200 comprises logic 201 and power gates 202 to provide gated power supply 213 to load 203. In one embodiment, logic 201 comprises control unit 204, analog-to-digital converter (ADC) 205, and digital-to-analog converter (DAC) 206. In one embodiment, control unit 204 comprises controller 204a and decoder 204b. In one embodiment, controller 204a receives an output 210 of ADC 205 to generate signal 211 which represents strength of power gates 202.

In one embodiment, controller 204a causes uniform gain across the operating regions of DLDO VR 200 to make the response fast for all operating points. In one embodiment, uniform gain across the operating regions by adding an extra gain factor which is a function of the operating point to the filter transfer function.

In one embodiment, decoder 204b receives signal 211 and decodes it into digital code 212 to turn ON/OFF power gates 202. In one embodiment, decoder 204b generates a binary coded digital code 212. In one embodiment, decoder 204b generates a thermometer coded digital code 212. In another embodiment, decoder 204b employs other forms of coding schemes to generate digital code 212.

In one embodiment, decoder 204b receives a bypass signal from PCU 124 to instruct DLDO VR 200 to operate in bypass mode. In one embodiment, decoder 204b generates digital code 212 to cause all (or substantially all) power gates to turn ON when the bypass signal indicates bypass mode. In such an embodiment, output of ADC 205 and controller 204a are bypassed. In one embodiment, when all (or substantially all) power gates of 202 are turned ON, gated power supply 213 is substantially the same (in voltage level and current drive) as un-gated power supply 128 (same as first power supply 128). In one embodiment, when the bypass signal indicates that DLDO VR 200 should operate in normal mode (i.e., LDO mode), decoder 204b decodes signal 211 from controller 204a. In such an embodiment, ADC 205 is not bypassed and feedback loop from 208 to 212 is functional.

In one embodiment, decoder 204b receives pgt_en signal (power gate enable) to enable or disable power gates 202. For example, when processor module operates in lower or lowest power state, power gate 202 is turned OFF so that gated power supply 213 is floating. In this example, pgt_en signal instructs decoder 204b to generate digital code 212 which turns OFF all power gate devices in power gate 202. In one embodiment, when pgt_en signal is enabled, decoder 204b operates in normal (i.e., LDO mode) or bypass mode.

In one embodiment, controller 204a receives a digital representation of gated power supply 213 and determines whether to raise or lower gated power supply 213. In one embodiment, during LDO mode, control unit 204 causes devices of power gate 202 to turn ON or OFF to modulate effective resistance of power gate 202 to achieve a gated power supply 213 for a given load current (of load 203). In such an embodiment, power gate 202 operates like a linear voltage regulator with a wide operating range. In one embodiment, controller 204a compensates for any dominant pole in the DLDO VR 200.

In one embodiment, controller 203a provides uniform gain across the operating regions of DLDO VR 200 to make the response fast for all operating points. In one embodiment, uniform gain across the operating regions is achieved by adding an extra gain factor which is a function of the operating point to the filter transfer function.

In one embodiment, power gate 202 comprises p-type devices (MP1-MPN, where 'N' is an integer greater than one) with source and drain terminals coupled between un-gated power supply 128 and gated power supply 213. In such an embodiment, gate terminals of the p-type devices are driven by digital code 212. In one embodiment, power gate 202 comprises n-type devices (not shown) with source and drain terminals coupled between un-gated power supply 128 and gated power supply 213. In such an embodiment, gate terminals of the n-type devices are driven by an inverse of digital code 212. In one embodiment, power gate 202 comprises a combination of n-type and p-type devices coupled between un-gated power supply 128 and gated power supply 213. In such an embodiment, gate terminals of p-type devices are driven by digital code 212 while gate devices of n-type devices are driven by inverse of digital code 212.

In one embodiment, resistors are coupled in series to n-type and/or p-type devices, where one end of the resistor(s) is coupled to the source/drain terminals of the n-type and/or p-type devices while the other end of the resistor(s) is coupled to the gated power supply 213. In other embodiments, other combination of transistors and active/passive devices may be used to implement power gate 202 which is controllable by digital code 212 (and/or inverse of digital code 212). In one embodiment, devices of power gate 202 operate in triode region (or linear region) and gated power supply 213 is modulated (by control unit 204) by turning on and/or off devices of power gate 202.

In one embodiment, DLDO VR 200 is a two pole system. The first pole being the pole associated with gated power supply 213, which is defined by impedance of load 203 and the output impedance of power gate 202. The second pole being an integration pole introduced by controller 204 at the origin to reduce steady state error to zero. In one embodiment, control unit 204 compensates for the pole associated with gated power supply 213, which is defined by impedance of load 203 and the output impedance of power gate 202 (as seen from load 203). In such an embodiment, the pole associated with gated power supply 213 is compensated by introducing a zero and without lowering loop gain and bandwidth. The lead compensation performed by control unit 204 enhances bandwidth and gain of DLDO VR 200. A mathematical model of controller 204a that performs lead compensation is described with reference to FIG. 3.

Referring back to FIG. 2, in one embodiment, ADC 205 is a flash ADC. In one embodiment, ADC 205 is a windowed flash ADC. In one embodiment, ADC 205 is a Sigma Delta ADC. In another embodiment, ADC 205 is a Full flash ADC. In one embodiment, ADC 205 comprises a plurality of comparators 207-1 to 207-N, where 'N' is an integer greater than one. In this example, N=6 and so the ADC is a 6-bit ADC having six comparators 207-1 to 207-N. In one embodiment, comparator 207-1 is a differential comparator which receives an input from DAC 206 and another input from gated power supply 213. The output of comparator 207-1 is a digital signal indicating whether gated power supply 213 is higher or lower than the input from DAC 206, which is one of the reference voltages of reference voltage bus 206.

In one embodiment, DAC 206 receives internal VID 129 and converts that to a bus of reference signals 209 which are analog representation of internal VID 129. In one embodiment, DAC 206 generates bus of reference signals 209 each of which is separated by a voltage (e.g., 12 mV). In other embodiments, other levels of granularity may be used for reference signals 209. In one embodiment, DAC 206 is implemented with a string of resistors coupled together in series. In one embodiment, DAC 206 is a current steering DAC. In another embodiment, DAC 206 is an R/2R DAC which is an alternative to binary-weighted-input DAC.

In one embodiment, comparator 207-6 receives a first reference voltage from bus of reference signals 209. In one embodiment, comparator 207-6 receives second reference voltage from bus of reference signals 209, the second reference voltage being 'X' mV more than first reference voltage, where 'X' is a number. In one embodiment, comparator 207-1 receives sixth reference voltage from bus of reference signals 209, the sixth reference voltage being 6 times 'X' mV more than first reference voltage. In other embodiments, order of assignment of reference signals 209 to comparators of ADC 205 may be reversed.

In one embodiment, output 212 of ADC 205 indicates digital representation of gated power supply 213. In one embodiment, output 212 is thermometer coded and is converted into binary code by a thermometer to binary converter (not shown), and the binary code is provided to control unit 204. In other embodiments, output 212 of ADC 205 is directly received by control unit 204 without having to convert from thermometer code to binary code.

In one embodiment, control unit 204 can be synthesized using RTL (register hardware language) because components of control unit 204 are digital. There are several technical effects of using digital control unit 204 in DLDO VR 200. Some non-limiting technical effects of control unit 204 in particular and DLDO VR 200 in general include near elimination of DC current path in control unit 204 of DLDO VR 200 since it is a synthesized logic with low quiescent current in standby mode.

In one embodiment, the coefficients of controller 204a are reprogrammable which allow the loop in DLDO VR 200 to be tuned late even after the SoC is fabricated. In one embodiment, controller 204a compensates for the pole on the output node of DLDO VR 200, and so there is nearly zero DC gain error in the DLDO VR loop. In one embodiment, DLDO VR 200 allows for soft start of the power-gate 202 using digital code 212. DLDO VR 200 allows for designers to have control over the distribution of power-gate devices (e.g., MP1-MPN) with similar weights to ensure uniform power delivery to all sections of the load 203. This will ensure, for example, that the load line does not cause a non-uniform voltage drop based on which section of the load is drawing current.

In one embodiment, DLDO VR 200 allows for employing non-linear control features like asymmetric/non-linear gain functions to improve the droop response of the VR. For example, when error voltage to ADC 205 is high enough to exceed the range of the windowed ADC, the error is assumed to be high enough (i.e., out of bounds) to cause the DLDO VR 200 to exit from linear gain control. In this condition, a large (programmable) number of FETs in 202 are turned ON instantly in one clock period to provide extra charge to load 203. Such non-linear control feature is used to compensate for the droop in the supply voltage 208, according to one embodiment.

In one embodiment, DLDO VR 200 allows for input voltage (e.g., reference signals 209) to be defined by a digital internal VID code 129, which is simpler to implement (compared to analog circuits) in the digital domain. In one embodiment, DLDO VR 200 allows for integrating simpler DFT (design for test) circuits as more circuits of DLDO VR 200 are digital (compared to a regular LDO). Such DFTs can allow for HVM (high volume manufacturing) testing.

One incentive of using DLDO VR 200 is that processor cores (or modules) of a processor or SoC can smoothly transition from bypass to regulation mode (i.e., LDO mode) in small steps (e.g., 12 mV). This allows modulation of gated power supply 213 based on processor or SoC performance with dynamic change of power states. In one embodiment, DLDO VR 200 also allows for fine tuning of gated power supply 213 to each processor core (or module) that are at the same level of performance (e.g., turbo mode 202, HFM 203, etc.).

Due to process variations, even for functioning at same performance levels, different processor cores (e.g., $125_{1-N}$) may need different voltages. For example, slower processor cores may need higher supply voltage to churn out same performance and faster processor cores may need lower supply voltage to churn out same performance as the slower processor. In one embodiment, internal VID 129 provides the ability to tune the supply voltage to each processor core by a predefined (or programmable) amount without needing voltage level shifters in the input output logic. In one embodiment, the predefined (or programmable) amount is +/−50 mV. In other embodiments, other voltage levels may be used for the predefined (or programmable) amount. This capability (via internal VID 129) gives additional power savings to the system since individual processor cores can be tuned to a suited voltage.

Figure 3:
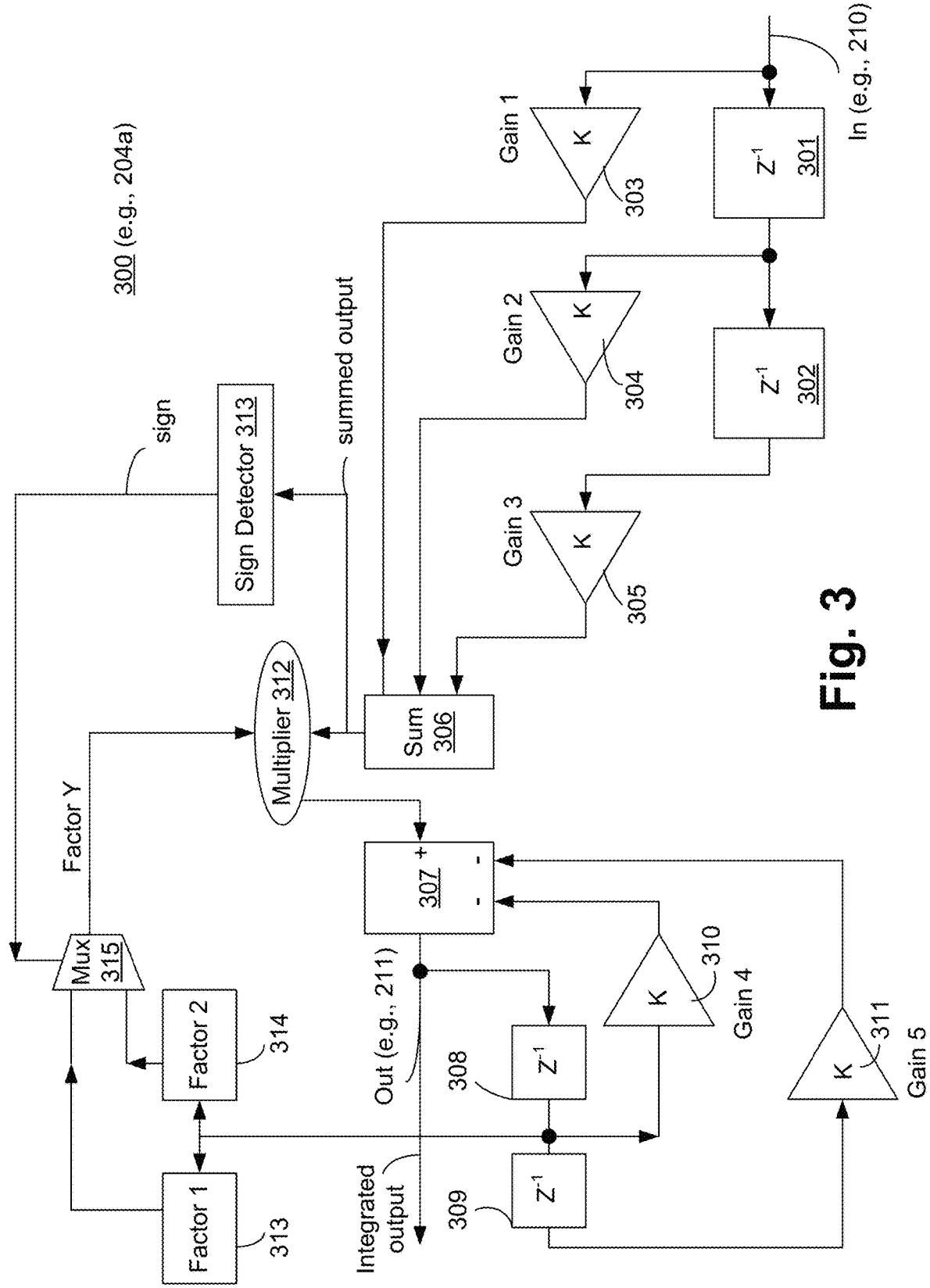
FIG. 3 illustrates a mathematical model for implementing a controller of the DLDO VR, according to one embodiment of the disclosure.

FIG. 3 illustrates a logical model 300 for implementing a controller (e.g., 204a) of DLDO VR 200, according to one embodiment of the disclosure. It is pointed out that those elements of FIG. 3 having the same reference numbers (or names) as the elements of any other figure can operate or function in any manner similar to that described, but are not limited to such.

In one embodiment, logical model 300 comprises first delay stage 301($Z^{-1}$) which receives input 212 from ADC 205. In one embodiment, output of delay stage 301 is received by second delay stage 302 ($Z^{-1}$). In one embodiment, input 212 and its delayed versions from delay stages 301 and 302 are amplified by gain stages 303 (Gain 1), 304 (Gain 2), and 305 (Gain 3), respectively, where 'K' indicates the gain amount. In one embodiment, output of the gain stages 303, 304, and 305 are summed by summing unit 306.

In one embodiment, output of summing unit 306 is received by Multiplier 312. In one embodiment, output of summing unit 306 is the "summed output" which is received by Sign Detector 313. In one embodiment, Sign Detector 313 is implemented as a logic that determines if the binary code from the previous stage is positive or negative. In one embodiment, Sign Detector 313 determines the sign of the summed output. In one embodiment, positive sign of the summed output indicates direction of decreasing loop gain while negative sign indicates direction of increasing loop gain. In one embodiment, depending on the direction of the sign, a factor is selected by Multiplexer 315. In one embodiment, this factor (i.e., output of Multiplexer 312) is multiplied by Multiplier 312 with the summed output from summing unit 306. In one embodiment, output of Multiplier 315 is provided to logic unit 307 (also referred here as the integrator).

In one embodiment, logic unit 307 adds the output with the previous value of the output and subtracts two signals (from gain units 310 and 311). In one embodiment, output 211 (also referred to as the integrated output) of controller 204a is delayed by third delay stage 308 ($Z^{-1}$). In one embodiment, output of third delay stage 308 is further delayed by fourth delay stage 309 ($Z^{-1}$). In one embodiment, outputs of third and fourth delay stages (308 and 309 respective) are amplified by gain units 310 (Gain 4) and 311 (Gain 5), respectively. In one embodiment, outputs of gain units 310 and 311 are received by logic unit 307. In one embodiment, logic unit 307 subtracts outputs of gain units 310 and 311 from output of summing unit 306 to generate output 211. In one embodiment, output 211 is decoded by decoder 204b to generate digital code 212 to control power gate 202.

In one embodiment, output of third delay stage 308 is provided to logic units 313 and 314 which convert it into scalar factors. In one embodiment, Factor 1 is a large positive factor which is selected by Multiplexer 312 (via sign) when summed output has a positive direction of gain. In one embodiment, Factor 2 is a lower factor or 1, which is selected by Multiplexer 312 (via sign) when summed output has a negative direction of gain.

In the embodiments, the gain of the loop is modified as a function of the operating point. In one embodiment, the gain is modified by multiplying a factor Y (i.e., output of Multiplexer 312) with the numerator of the transfer function i.e., summed output from summing unit 306. The numerator 'N' is defined by N=N1*Vin(n-2)+N2*Vin(n-1)+N3*Vin(n), where "N1" is Gain 3 of stage 305, "N2" is Gain 2 of stage 304, "N3" is Gain 1 of stage 303, Vin(n) is input 210, Vin(n-1) is output of delay stage 301, and Vin(n-2) is output of delay stage 302.

In one embodiment, the numerator value 'N' is multiplied by gain factor 'Y' determined by the output state of the transfer function. In one embodiment, when the Vout code to the power FETs is high, the gain of the system is low. This low gain is compensated by multiplying the numerator 'N' by a higher value. In such an embodiment, the gain of the transfer function is made flat for all operating points.

Since the gain is different when the code is increasing (direction of decreasing gain) and when the code is decreasing (direction of increasing gain) different multiplication factors are applied to the numerator when the numerator value (i.e., sign of summed output) is positive and when negative, according to one embodiment. In one embodiment, when 'N' has a net positive value, Multiplexer (i.e., Mux) 315 selects Factor 1 to increase loop gain. In one embodiment, when 'N' has a net negative value, Multiplexer 315 selects Factor 2 to lower loop gain.

In one embodiment, ideally the gain factor (i.e., one of outputs of 313 and 314) that should be multiplied with 'N' is the value of the output itself. As discussed above, the numerator 'N' is defined by N=N1*Vin(n-2)+N2*Vin(n-1)+N3*Vin(n). For example, when output of the integrator is a binary code of 1, 'N' is used as is, and when output of the integrator is a binary code of 2, the gain of the system reduces by the factor of the output value and is compensated by a gain proportional to the output. In one embodiment, for higher load currents, with adaptive gain described by the various embodiments, it is possible that the resolution of ADC 205 is higher than the granularity of the power FET 202. In this case a ripple may be caused on the voltage output 208. To avoid this ripple, in one embodiment, a gain factor whose value is less than 1 is used.

In one embodiment, logic unit 307 adds gains to the error signal, adds an integration function to reduce the DC error to zero (or close to zero), and also adds a pole and a zero to compensate for the load pole. The error signal is the voltage difference between the output node (e.g., 208) and the reference node (e.g., 209) of the regulator (e.g., 200). In one embodiment, the added zero compensates the effect of the load pole and the added pole ensures that the gain will be attenuated to below 0 dB beyond a certain frequency.

Figure 4:
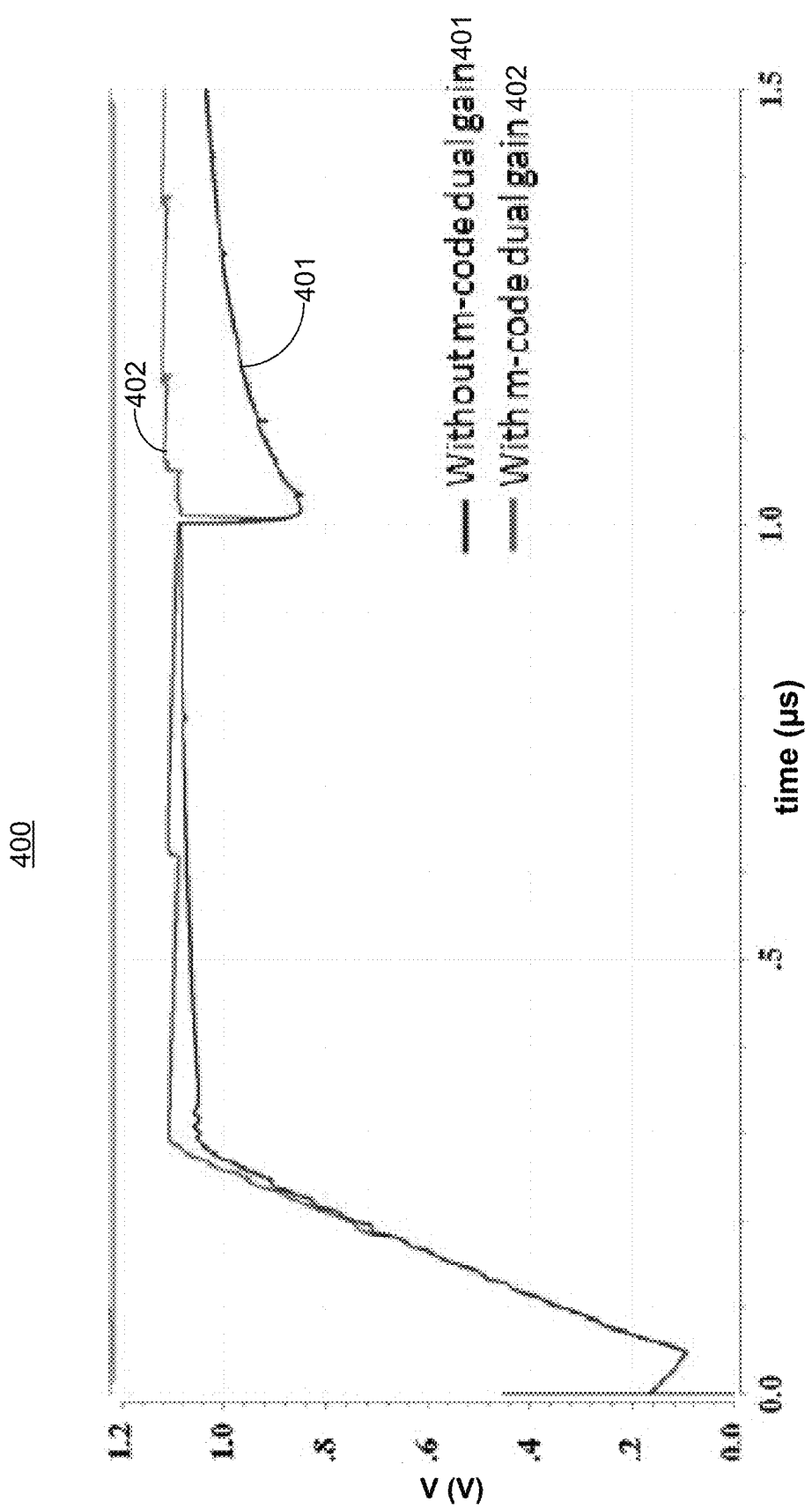
FIG. 4 illustrates a plot showing the technical effect of the controller, according to one embodiment of the disclosure.

FIG. 4 illustrates a plot 400 showing the technical effect of controller 204a, according to one embodiment of the disclosure. Here, x-axis is time in microseconds (μs) and y-axis is voltage (V). Plot 400 shows two waveforms. Waveform 401 on the top shows the transient response time using controller 204a with multiplying effect. Waveform 402, on the bottom of waveform 401, is the transient response when multiplying effect is not used in controller.

Figure 5:
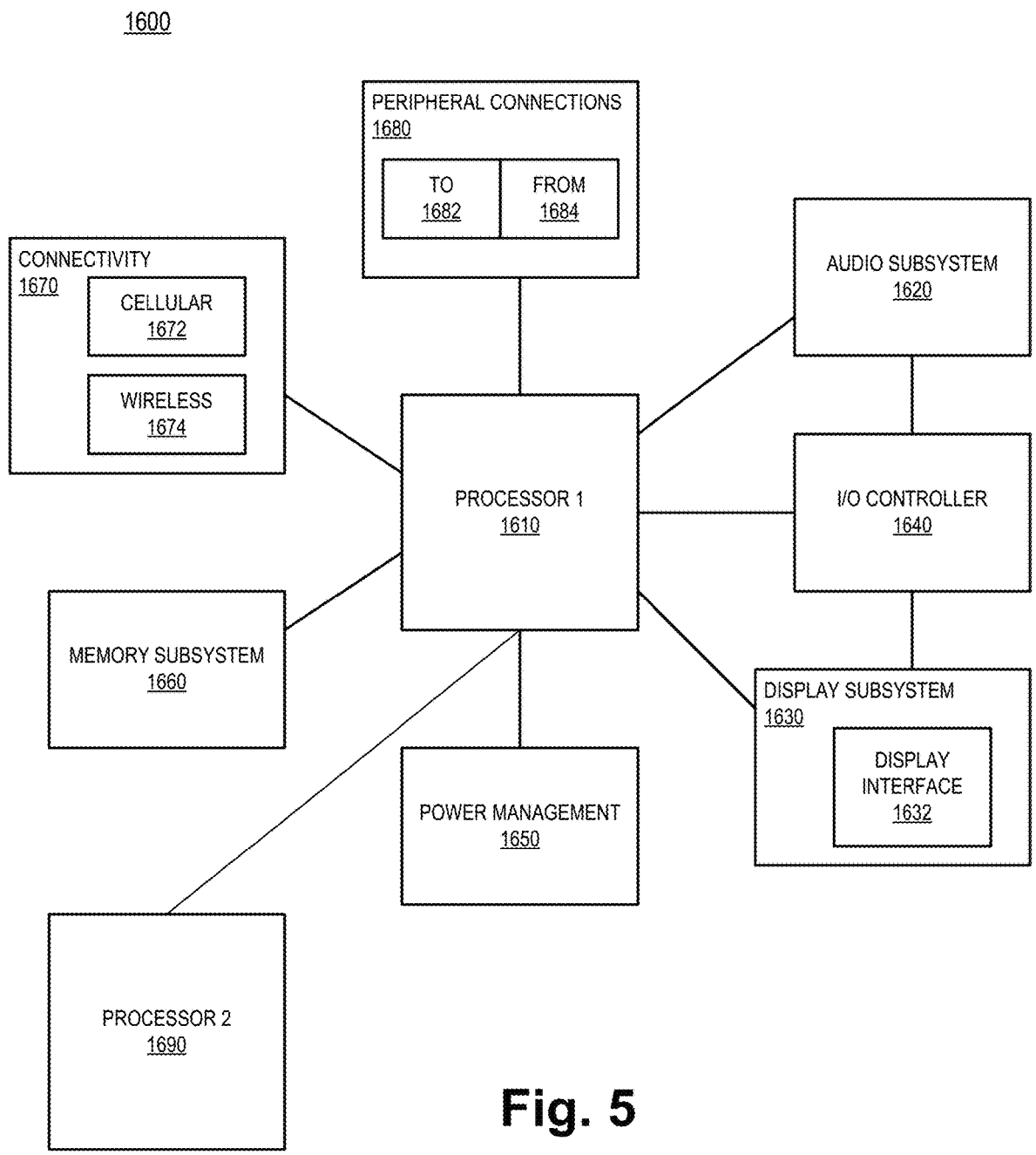
FIG. 5 illustrates a smart device or a computer system or an SoC (System-on-Chip) with the DLDO VR, according to one embodiment of the disclosure.

FIG. 5 illustrates a smart device or a computer system or an SoC with the DLDO VR, according to one embodiment of the disclosure. FIG. 5 illustrates a block diagram of an embodiment of a mobile device in which flat surface interface connectors could be used. In one embodiment, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In one embodiment, computing device 1600 includes a first processor 1610 with DLDO VR according to the embodiments. In one embodiment, computing device 1600 includes a second processor 1690 with DLDO VR, according to the embodiments discussed herein. In one embodiment, second processor 1690 is optional. Other blocks of the computing device 1600 with I/O drivers may also include DLDO VR of the embodiments. The various embodiments of the present disclosure may also comprise a network interface within 1670 such as a wireless interface so that a system embodiment may be incorporated into a wireless device, for example, cell phone or personal digital assistant.

In one embodiment, processor 1610 can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In one embodiment, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), Display-Port including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, an apparatus is provided which comprises: a plurality of power-gate transistors controllable by a digital bus, the plurality of power-gate transistors operable to provide a first power supply to a load, and to receive a second power supply as input; an analog-to-digital converter (ADC) to receive the first power supply and to generate a digital output representative of the first power supply; and a controller to receive the digital output representative of the first power supply and to generate the digital bus for controlling the plurality of power-gate transistors such that a transfer function of the plurality of power-gate transistors is substantially linear over an operating range.

In one embodiment, the controller is operable to modify gain of a loop formed by the plurality of transistors, ADC, and controller, and wherein the controller is operable to modify the gain of the loop as a function of an operating point. In one embodiment, the controller comprises: a first plurality of delay units coupled together in series, wherein one of the delay units of the first plurality of delay units receives the digital output representative of the first power supply; a first plurality of gain stages to amplify gain of outputs of each of the first plurality of delay units; and a summer to sum the amplified outputs to generated summed output.

In one embodiment, the controller comprises: a multiplier to multiple the summed output by a factor to modify the gain of the loop such that transfer function of the plurality of power-gate transistors is substantially linear over an operating range. In one embodiment, the controller comprises: a sign detector to detect sign of the summed output, wherein the detected sign to determine the factor. In one embodiment, the controller comprises: a second plurality of delay units coupled together in series, wherein one of the delay units of the second plurality of delay units receives an output of the controller; and a second plurality of gain stages to amplify gain of outputs of each of the second plurality of delay units.

In one embodiment, the controller comprises: an integrator to integrate the amplified outputs of each of the second plurality of delay units and an output of the multiplier, the integrator to generate the output of the controller. In one embodiment, the plurality of power-gate transistors is p-type transistors. In one embodiment, the apparatus further comprises a digital-to-analog converter (DAC) to convert a voltage identification signal (VID) into a plurality of analog signals for the ADC. In one embodiment, the VID is generated by a power control unit (PCU).

In one embodiment, the apparatus further comprises a decoder to decode an output of the controller to generate the digital bus for controlling the plurality of power-gate transistors. In one embodiment, the decoder is operable to cause the apparatus to operate in bypass mode by turning on substantially all of the plurality of power gate transistors. In one embodiment, the decoder is operable to generate the digital signal to cause all the plurality of power gate transistors to turn off.

In another example, a system is provided which comprises: a memory unit; and a processor coupled to the memory, the processor having a voltage regulator according to the apparatus discussed above. In one embodiment, the system further comprises a wireless interface for allowing the processor to communicate with another device through an antenna. In one embodiment, the system further comprises a display unit. In one embodiment, the display unit is a touch screen.

In another example, an apparatus is provided which comprises: a controller to receive a digital output representative of a first power supply and to generate the digital bus for controlling a plurality of power-gate transistors such that a transfer function of the plurality of power-gate transistors is substantially linear over an operating range; and a decoder to decode an output of the controller to generate the digital bus for controlling the plurality of power-gate transistors.

In one embodiment, the controller is operable to modify gain of a loop formed by the plurality of transistors, an Analog-to-Digital Converter (ADC), and the controller, wherein the controller is operable to modify the gain of the loop as a function of an operating point. In one embodiment, the controller comprises: a first plurality of delay units coupled together in series, wherein one of the delay units of the first plurality of delay units receives the digital output representative of the first power supply; a first plurality of gain stages to amplify gain of outputs of each of the first plurality of delay units; and a summer to integrate the amplified outputs to generated a summed output.

In one embodiment, the controller comprises: a multiplier to multiple the summed output by a factor to modify the gain of the loop such that transfer function of the plurality of power-gate transistors is substantially linear over an operating range. In one embodiment, the controller comprises: a sign detector to detect sign of the summed output, wherein the detected sign to determine the factor. In one embodiment, the controller comprises: a second plurality of delay units coupled together in series, wherein one of the delay units of the second plurality of delay units receives an output of the controller; and a second plurality of gain stages to amplify gain of outputs of each of the second plurality of delay units. In one embodiment, the controller comprises: an integrator to integrate the amplified outputs of each of the second plurality of delay units and an output of the multiplier, the integrator to generate the output of the controller.

In another example, a system is provided which comprises: a memory unit; and a processor coupled to the memory, the processor having a voltage regulator according to the apparatus discussed above. In one embodiment, the system further comprises a wireless interface for allowing the processor to communicate with another device through an antenna. In one embodiment, the system further comprises a display unit. In one embodiment, the display unit is a touch screen.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A voltage regulator comprising:
   a plurality of power-gate transistors to provide a power supply to a load based on a digital control signal;
   an analog-to-digital converter (ADC) to receive the power supply and to generate a digital output representative of the power supply; and
   a controller to receive the digital output and to generate the digital control signal based on the digital output representative of the power supply, wherein the controller includes:
   a plurality of delay units coupled together in series, wherein a first delay unit of the plurality of delay units receives the digital output representative of the power supply;
   a plurality of gain stages to amplify gain of outputs of each of the plurality of delay units to generate respective amplified outputs;
   a summer to sum the amplified outputs to generate a summed output; and
   a multiplier to multiply the summed output by a factor to modify a gain of a loop formed by the plurality of power-gate transistors, the ADC, and the controller.

2. The voltage regulator of claim 1, wherein the multiplier is to multiply the summed output by a factor to modify the gain of the loop such that a transfer function of the plurality of power-gate transistors is substantially linear over an operating range.

3. The voltage regulator of claim 1, wherein the controller comprises:
   a sign detector to detect if the summed output is negative or positive, wherein the detected negative or positive summed output is used to determine the factor.

4. The voltage regulator of claim 1, wherein the plurality of delay units are a first plurality of delay units, wherein the plurality of gain stages are a first plurality of gain stages, and wherein the controller comprises:
   a second plurality of delay units coupled together in series, wherein one of the delay units of the second plurality of delay units receives an output of the controller; and
   a second plurality of gain stages to amplify gain of outputs of each of the second plurality of delay units.

5. The voltage regulator of claim 1, further comprising a digital-to-analog converter (DAC) to convert a voltage identification signal (VID) into a plurality of analog signals for the ADC.

6. The voltage regulator of claim 1, further comprising a decoder to decode an output of the multiplier to generate the digital control signal.

7. The voltage regulator of claim 6, wherein the decoder is operable to cause the voltage regulator to operate in bypass mode in which all of the plurality of power-gate transistors are turned on.

8. The voltage regulator of claim 6, wherein the decoder is operable to generate the digital control signal to cause all the plurality of power-gate transistors to turn off.

9. The voltage regulator of claim 1, wherein the voltage regulator and the load are included in a same integrated circuit die.

10. An apparatus comprising:
    a plurality of power-gate transistors to generate a power supply based on a digital control signal;
    a controller to receive a digital output representative of the power supply and to generate an output based on a digital signal representative of the power supply, wherein the controller includes:
    a plurality of delay units coupled together in series, wherein one of the delay units of the plurality of delay units is to receive the digital signal representative of the power supply;
    a plurality of gain stages to amplify gain of outputs of each of the plurality of delay units to generate respective amplified outputs;
    a summer to integrate the amplified outputs to generate a summed output; and
    a multiplier to multiply the summed output by a factor to generate the output of the controller; and
    a decoder to decode the output of the controller to generate the digital control signal.

11. The apparatus of claim 10, wherein the multiplier is to multiply the summed output by the factor to modify a gain of the apparatus such that a transfer function of the plurality of power-gate transistors is substantially linear over an operating range.

12. The apparatus of claim 10, wherein the controller comprises:
  a sign detector to detect if the summed output is negative or positive, wherein the detected negative or positive summed output is used to determine the factor.

13. The apparatus of claim 10, wherein the plurality of delay units are a first plurality of delay units, wherein the plurality of gain stages are a first plurality of gain stages, and wherein the controller further comprises:
  a second plurality of delay units coupled together in series, wherein one of the delay units of the second plurality of delay units receives the output of the controller; and
  a second plurality of gain stages to amplify gain of outputs of each of the second plurality of delay units.

14. The apparatus of claim 10, wherein the decoder is operable to cause the apparatus to operate in bypass mode in which all of the plurality of power-gate transistors are turned on.

15. The apparatus of claim 10, wherein the decoder is operable to generate the digital control signal to cause all the plurality of power-gate transistors to turn off.

16. The apparatus of claim 10, wherein the power supply is to be provided to a load that is on a same integrated circuit die as the plurality of power-gate transistors, the controller, and the decoder.

17. A computing system comprising:
  a memory unit;
  a processor coupled to the memory unit, the processor having a voltage regulator that includes:
    a circuit block;
    a plurality of power-gate transistors to provide a power supply to the circuit block based on a digital control signal; and
    a controller to receive a digital output and to generate the digital control signal based on a voltage level of the power supply, wherein the controller includes:
      a plurality of delay units coupled together in series, wherein a first delay unit of the plurality of delay units receives a digital signal representative of the voltage level of the power supply;
      a plurality of gain stages to amplify gain of outputs of each of the plurality of delay units to generate respective amplified outputs;
      a summer to sum the amplified outputs to generate a summed output; and
      a multiplier to multiply the summed output by a factor to modify a gain of a loop formed by the plurality of power-gate transistors and the controller; and
  a wireless interface to enable the processor to communicate with another device through an antenna.

18. The computing system of claim 17, wherein the multiplier is to multiply the summed output by a factor to modify the gain of the loop such that a transfer function of the plurality of power-gate transistors is substantially linear over an operating range.

19. The computing system of claim 17, wherein the controller comprises:
  a sign detector to detect if the summed output is negative or positive, wherein the detected negative or positive summed output is used to determine the factor.

20. The computing system of claim 17, wherein the plurality of delay units are a first plurality of delay units, wherein the plurality of gain stages are a first plurality of gain stages, and wherein the controller comprises:
  a second plurality of delay units coupled together in series, wherein one of the delay units of the second plurality of delay units is to receive an output of the controller; and
  a second plurality of gain stages to amplify gain of outputs of each of the second plurality of delay units.

21. The computing system of claim 17, further comprising a decoder to decode an output of the multiplier to generate the digital control signal.

22. The computing system of claim 21, wherein the decoder is operable to cause the apparatus to operate in bypass mode in which all of the plurality of power-gate transistors are turned on; and
  wherein the decoder is operable to generate the digital control signal to cause all the plurality of power-gate transistors to turn off.

23. The computing system of claim 17, further comprising a display unit coupled to the processor.

* * * * *